(12) United States Patent
Green et al.

(10) Patent No.: US 7,143,088 B2
(45) Date of Patent: Nov. 28, 2006

(54) DYNAMIC-CONTENT WEB CRAWLING THROUGH TRAFFIC MONITORING

(75) Inventors: Jacob Green, Baltimore, MD (US); John Schultz, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 426 days.

(21) Appl. No.: 10/433,605

(22) PCT Filed: Dec. 14, 2001

(86) PCT No.: PCT/US01/48291

§ 371 (c)(1), (2), (4) Date: Feb. 20, 2004

(87) PCT Pub. No.: WO02/50703

PCT Pub. Date: Jun. 27, 2002

(65) Prior Publication Data

US 2004/0128285 A1    Jul. 1, 2004

Related U.S. Application Data (60) Provisional application No. 60/255,392, filed on Dec. 15, 2000.

(51) Int. Cl.
*G06F 17/00* (2006.01)
(52) U.S. Cl. ................................. 707/3; 707/6; 707/10
(58) Field of Classification Search .................... 707/3, 707/6, 10
See application file for complete search history.

(56) References Cited

U.S. PATENT DOCUMENTS 5,987,471 A   11/1999   Bodine et al.
5,987,515 A   11/1999   Ratcliff et al.
6,061,682 A    5/2000   Agrawal et al.

OTHER PUBLICATIONS

An efficient scheme to remove crawler traffic from the Internet Yuan, X.; MacGregor, M.H.; Harms, J.; Computer Communications and Networks, 2002. Proceedings. Eleventh International Conference on Oct. 14-16, 2002 pp. 90-95.*

(Continued)

*Primary Examiner*—David Jung
(74) *Attorney, Agent, or Firm*—Whitham, Curtis, Christofferson & Cook, PC (57) ABSTRACT

A dynamic-content web crawler is disclosed. These New Crawlers (NCs) are located at points between the server and user, and monitor content from said points, for example by proxying the web traffic or sniffing the traffic as it goes by. Web content is recursively parsed into subcomponents. Sub-components are fingerpinted with a cyclic redundancy check code or other loss-full compression in order to be able to detect recurrence of the sub-component in subsequent pages. Those sub-components which persist in the web traffic, as measured by the frequency NCs (6) are defined as having substantive content of interest to data-mining applications. Where a substantive content sub-component is added to or removed from a web page, then this change is significant and is sent to a duplication filter (11) so that if multiple NCs (6) detect a change in a web page only one announcement of the changed URL will be broadcast to data-mining applications (8). The NC (6) identifies substantive content sub-components which repeatably are part of a page pointed to by a URL. Provision is also made for limiting monitoring to pages having a flag authorizing discovery of the page by a monitor.

20 Claims, 3 Drawing Sheets

OTHER PUBLICATIONS

A probabilistic model for intelligent Web crawlers Ke Hu; Wing Shing Wong; Computer Software and Applications Conference, 2003. COMPSAC 2003. Proceedings. 27th Annual International Nov. 3-6, 2003, pp. 278-282.*

Ontology-based Web crawler Ganesh, S.; Jayaraj, M.; Kalyan, V.; SrinivasaMurthy; Aghila, G.; Information Technology: Coding and Computing, 2004. Proceedings. ITCC 2004. International Conference on vol. 2, 2004 pp. 337-341 vol. 2.*

* cited by examiner

DYNAMIC-CONTENT WEB CRAWLING THROUGH TRAFFIC MONITORING

This patent application claims priority from U.S. provisional application 60/255,392 of the same title as the present application filed on Dec. 15, 2000.

BACKGROUND OF THE INVENTION

1. Field of the Invention

The present invention generally relates to techniques for systematically locating and monitoring information on the Internet, and in particular to a genre of such techniques known as "web crawlers."

2. Background Description

Web Crawlers are programs used to find, explore, and monitor content on the World Wide Web (WWW). They are the primary methods used by most data-mining applications such as search engines to discover and monitor WWW content. Due to the distributed nature of the WWW, crawling currently represents the best method for understanding how content on the WWW changes.

The WWW is a large connected graph of HyperText Markup Language (HTML) pages distributed over many computers connected via a network. The pages are connected and accessed by Universal Resource Locators (URLs). These URLs are addresses to the HTML pages.

A crawler is seeded with a set of URLs. These URLs are placed in a queue. For each of the URLs, the program downloads the page. It then extracts the external URLs referenced on that page, before proceeding to the page of the next URL in the queue. Each of the URLs extracted is then added at the end of the queue with the other URLs the crawler was seeded with. This process repeats indefinitely. The URLs collected and queued in this fashion form a WWW graph, wherein each URL is linked to a seed URL, or to another URL on whose page the URL was found, and to those other URL's referenced on the URL's page.

The foregoing crawling algorithm describes a breadth-first explanation of the WWW graph. Other methods of exploring content of the WWW may use depth-first searches or hybrid solutions.

The problem with current crawlers is the fact that they have finite resources and can get into infinite loops traversing the changing WWW graph. By following one URL, that URL can bring up a page with other URLs, and so on and so forth. Because these pages and URLs can be generated dynamically ("dynamic content") at the time of the request, a crawler can be faced with exploring an infinite graph.

When users or web crawlers make a request for a web page via its URL, the request is sent to a web server responsible for returning the HTML page requested. In the early days of the WWW, these web pages were stored as files on the permanent storage of the web server. The web server was simply a "file server". There was a 1 to 1 mapping between a URL and a specific web page. Since those early days web servers do not necessarily simply serve back stored files. Many times the file is generated "on the fly" based on a number of parameters (URL with parameter string, cookies, time-of-day, user info, information in a database, prior history, etc.). These parameters are infinite in their variety and values. When pages are created in this manner, they are commonly referred to as "dynamic content," as opposed to the early "static content" that was simply non-changing web files.

SUMMARY OF THE INVENTION

It is therefore an object of the present invention to provide a method for exploring and monitoring web content by monitoring web traffic in order to feed data-mining applications in ways analogous to how web-crawlers have done so in the past.

A further object of the invention is to explore and monitor dynamic and static content, not just static content, and identify web pages having new or deleted substantive content to one or a plurality of data-mining applications.

Another object of the invention is to update web content indices using a methodology which is based upon a changing infinite graph model of the web.

It is also an object of the invention to limit announcement of new content to those web pages which contain substantive content changes, ignoring changes in mere HTML code or other non-relevant changes.

Another object of this invention is to discover and monitor substantive content blocks that are common to many web pages.

Yet another object of the invention is to avoid custom time consuming integration with web servers in order to access dynamic content, in favor of a universal "black box" solution.

A further object of this invention is to limit the resources required of web servers to service web crawlers.

The present invention provides a solution to these problems by modeling the WWW as an infinite graph, which therefore cannot be explored in the normal way. The graph of the WWW is explored by examining the finite content that is being generated by real users requesting real pages. Under this approach, "New Crawlers" (NCs) proxy the web traffic between users and web servers, or "sniff" this traffic. Proxying or sniffing, or other methods that gain access to web requests and responses, shall from this point be called "proxying" to simplify the discussion. The reader will however keep in mind the variety of methods available to accomplish this task.

These NCs can proxy this content anywhere in the communications path between the web server and end users. Alternatively they can sniff the content as it passes by, thereby not interfering with the communication pathway. As content passes by, the crawlers examine the pages. The method of examination parses a page into sub-components. This process is recursive and creates sub-components of sub-components, as will be evident from the appended pseudo-code and more detailed description of the parsing methods below. These sub-components are uniquely identified with a fingerprint. With the dynamic content methodologies now used at servers to generate responses to a URL request, much of the content of the returned page may be different for each access, but these differences are not significant from the viewpoint of data-mining applications. The present invention filters these insignificant differences out by using the unique fingerprints to identify those sub-components which persist. It does so over time and across multiple and different URLs and HTML pages. When one of these persistent sub-components is added to or deleted from a web page, this change is defined as "substantive" for the purposes of describing the present invention.

The NCs can then send these pages and URL addresses back to the indexing or collection points of a system. Alternatively they can keep caches of these pages, or keep records of unique fingerprints of these pages, to reduce the number of pages that get sent back, and only send back pages that have received a threshold of access. Alternatively they can break the pages into components, cache the components (or their unique fingerprints) and send back only those components that have received a certain threshold of access, irrespective of which actual web pages and URLs generated these components. Once a page or component has been announced to the data-mining systems, the NC acts as a block to stop retransmission of content already announced. Pages and components not resident in these caches are either new or have previously been expired from the cache. Changes in any page or component will result in the creation of a new page or new component on which this process will repeat.

Since NCs may not be directly proxying information in front of a designated web server for that content (as is the example if the proxying occurs at the ISP level), then there will be multiple NCs "announcing" new content from the same sub component or page. For example is one NC resides on an ATT backbone and another resides on an AOL backbone, both may encounter a web page from cnn.com. Since neither NC knows what the other has seen, both will need to cache and monitor the page. It is therefore a realistic outcome for the cnn page to be announced multiple times. To handle this problem of duplicate announcements the announcements are sent to an intermediary "Duplication Filter" that acts to collapse multiple announcements into one. Therefore when new content is found separately by multiple NCs, only one announcement reaches the data-mining applications.

The announcement of new, changed, or deleted content by a plurality of NCs to a plurality of data-mining applications can be accomplished a number of ways, for example as further described in co-pending application PCT/US01/14701 to the same assignee and inventors entitled "Relevant Search Rankings Using High Refresh Rate Distributed Crawlings." Various forms of multicast technology may be employed. Messages can be sent to a central routing application that has knowledge of the subscribers to the update messages; alternatively IP-multicast may be used, or overlay networks and group communication systems may be used.

The use of a proxying NC removes considerable amounts of resource load from web servers that would normally have to service requests of conventional web crawlers. First, no actual requests are sent from the NC to the web servers. Therefore crawler based load is eliminated. Furthermore, because one or more NCs may feed many data-mining applications, multiple sets of independently operated NCs are not necessary, although they may be used for political reasons.

One alternative solution to using a proxying NC would be to build the change detection into a web site. The advantage the use of NCs has over this approach is in their "Black Box" feature. The NCs work with any web server regardless of how the content is created, whereas integrating into the creation processes of a web site is extremely complex and varies greatly among the millions of sites. Many components are used to generate the content a web server serves (databases, scripts, templates, etc). Change detection would need to be applied to all components in those solutions that build the change detection into the web site. Furthermore a system of NCs maintains the integrity of the knowledge it is providing. If web site owners were responsible for announcing when their pages change, based on some common format, then there is no guarantee that web site owners will actually perform that function. For a variety of reasons they may not follow the common format and announcement rules. By using NCs at many points it the network communications pathways, the NC owners avoid this problem and are able to ensure the accuracy of the updates.

This system of NCs can be incorporated into existing data-mining and indexing methods with very little change. By proxying just in front of the web servers, the data can be more easily broken up based on domain. But the proxying also can be done at caching servers in front of web servers, on the Internet Service provider's networks, or on caches right in front of the end user. By proxying content, the new crawlers can identify which pages are being requested and view the resulting responses. It is to be noted from the definition being used herein that the term "proxying" content requests includes "sniffing" (i.e. receiving a copy of the data stream) communication pathways. It is also to be noted that "proxying" can be implemented on a sampling of the content requests: full coverage of all requests is not necessary. However, the more content the NCs have to process the faster they are able to identify relevant from non-relevant content.

In those cases where unannounced proxying is not allowed because of legal requirements, a similar method could be employed. Caching, proxy, or sniffing servers would only cache, proxy, or sniff pages that have a special tag embedded in the HTML page. This tag would designate the page as being available for discovery by the NC system. Thus the creators of the pages give implicit permission for the page to be discovered using this method. The tag could also specify an alternative URL address to use to access the page content in case sensitive user specific information is included with the page or the URL. This method also has the advantage of giving the creators of web pages the ability to self request their pages a required number of times through a NC proxy server which would then discover the page. Extensions to this model of the use of tags can be used to instruct the NC on how to handle tagged content in many ways.

The downside to this approach is that content never requested by users or creators will not be identified by the system. Although existing crawlers may never have completely covered the entire WWW graph because of its infinite size, they may have explored possible content that has never been accessed by a user. By using both approaches together, a superior solution can evolve. Additionally, web site creators can manually make normal web requests for their content. This would pass their content through an NC, solving the problem of content that is never requested by normal users.

In one embodiment of the invention, a web crawler for handling static and dynamic content uses a parsing algorithm to recursively parsing web pages into sub-components. It then uses a loss-full compression algorithm to assign a unique fingerprint to each of the sub-components parsed from a web page responsive to a URL. Then the parsing algorithm, the loss-full algorithm, and the respective sub-component fingerprints with their corresponding URLs are sent to a data-mining application, which is then able to repeatably locate any of the sub-components.

In another embodiment a web crawler in accordance with the invention monitors web traffic at a plurality of points between webservers and users, and recursively parses into sub-components the web pages so monitored, the web traffic comprising web pages responsive to URLs. Then the crawler assigns a unique fingerprint to each parsed sub-component and keeps a count of the number of times each unique fingerprint recurs.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The prior art model of the web is the root cause of the problem with current crawlers. The prior art model effectively assumes a finite graph, which does not correspond to the reality of the web and is therefore in error. In reality, the graph changes all the time and the content at the nodes of the graph changes as well. Pages are created, destroyed, and changed. URLs are also created, destroyed, and changed. URL address mapping to web pages is not necessarily one-to-one (1-→1). Address mapping can also be many-to-one (N->1) or one-to-many (1-→N).

Where the mapping is many-to-one, many unique URL's retrieve the same web page. In a one-to-one mapping one unique URL retrieves the same web page. These results are acceptable. But a one-to-many mapping means that one URL gets many different web pages, which is not an acceptable result.

When a user makes a request to a web server for a page, the URL for the page is passed to the webserver. Yet this is not the only information that may be used in generating and returning a response. For example, information stored on the user's hard drive can be read and sent along with the URL request. Or the web server can use other information known about the user, or any other inputs needed to generate the page. This means that a request from one user may produce results which are different from the results produced from a request from another user, even when both use the same URL.

Therefore requests and responses can be grouped into three categories:

Responses based entirely on the URL
Responses based partly on the URL
Responses not based at all on the URL When a URL returns a page which is different from the page returned the last time the URL was requested, this means either:

A change has occurred in the content
This URL has a 1-→M mapping
Response is not entirely based on the URL Identifying which URLs have changed and which have not is fairly standard in the prior art methods for web crawling. Every time the page is visited, a loss-full compression fingerprint of the record is made; examples include MD5 checksums, a variety of hashing algorithms, a Cyclic Redundancy Check (crc) check-sum of the page's content, etc. The web page is run through an algorithm that produces a unique identifier of the page. On later visits by the web crawler, that fingerprint will be different if the page content has changed. This idea of tracking which pages have changed is important for indexes and data-mining applications. Most of these applications only want to see what is changing on the WWW, not a continuous river of known information, 99% of which they have already processed.

Yet dynamically generated content presents a problem. Thousands of URLs can all respond with slightly different HTML pages that all contain the same news article content. It can be argued that the important thing to watch for is changes in substantive content, not necessarily changes in HTML code. If there is a new news story, or new information, then this is a substantive change in content. Whereas a new or changed HTML page that changed the date or font and nothing else is not relevant for most applications. Therefore tracking changes in information blocks (sub-components) that may exist on a number of pages, helps to alleviate the problem caused by the infinite number of pages that exist.

Figure 1:
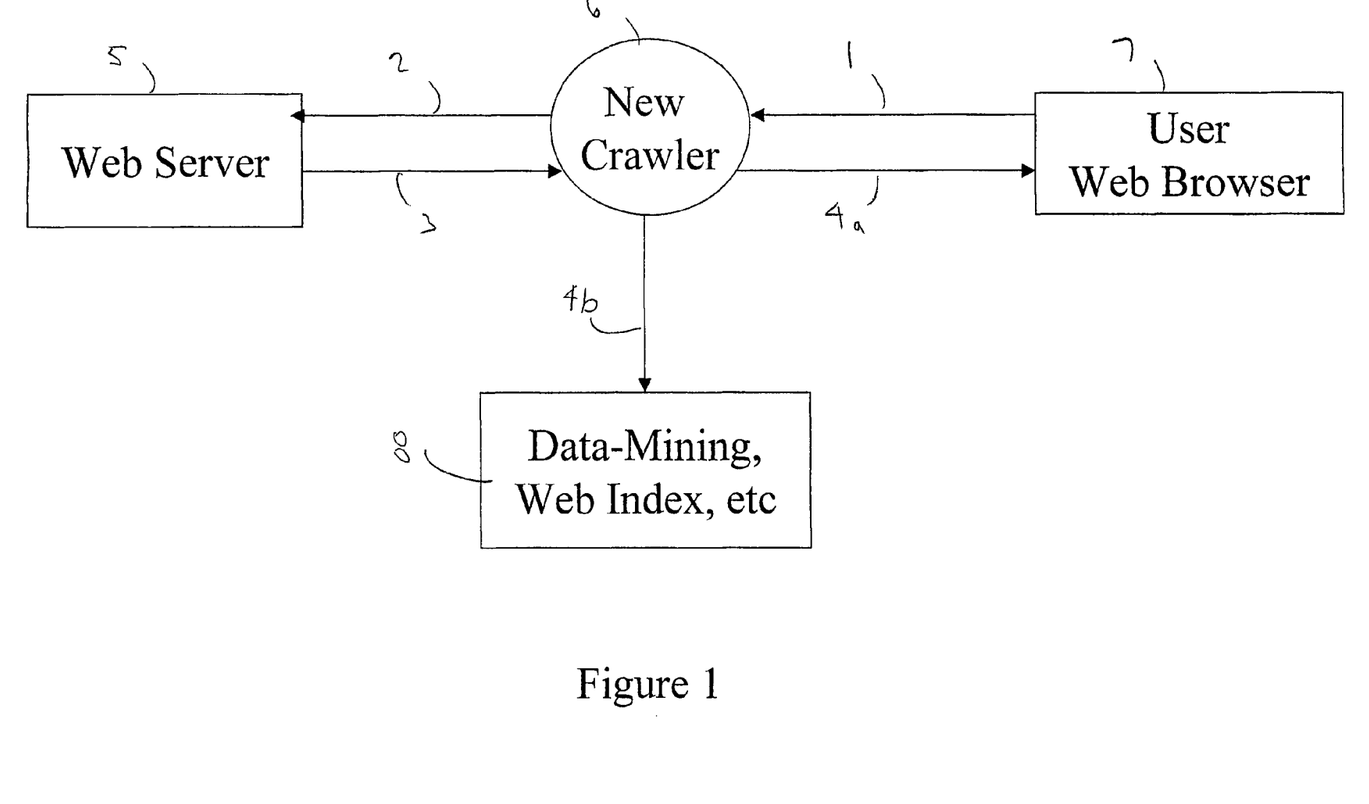
FIG. 1 depicts the proxying of web content by an NC.

Referring now to the drawings, and more particularly to FIG. 1, there is shown a schematic of the operation of a New Crawler on the web, serving a data mining application. A user web browser 7 requests 1 a URL. The New Crawler 6 forwards 2 the URL request to the web server 5 specified by the URL. The web server 5 returns 3 the requested page to the New Crawler 6, which forwards 4*a* the returned page to the user web browser 7. After processing the returned page, the New Crawler 6 sends 4*b* new sub-components or pages to the data mining applications 8.

Figure 2:
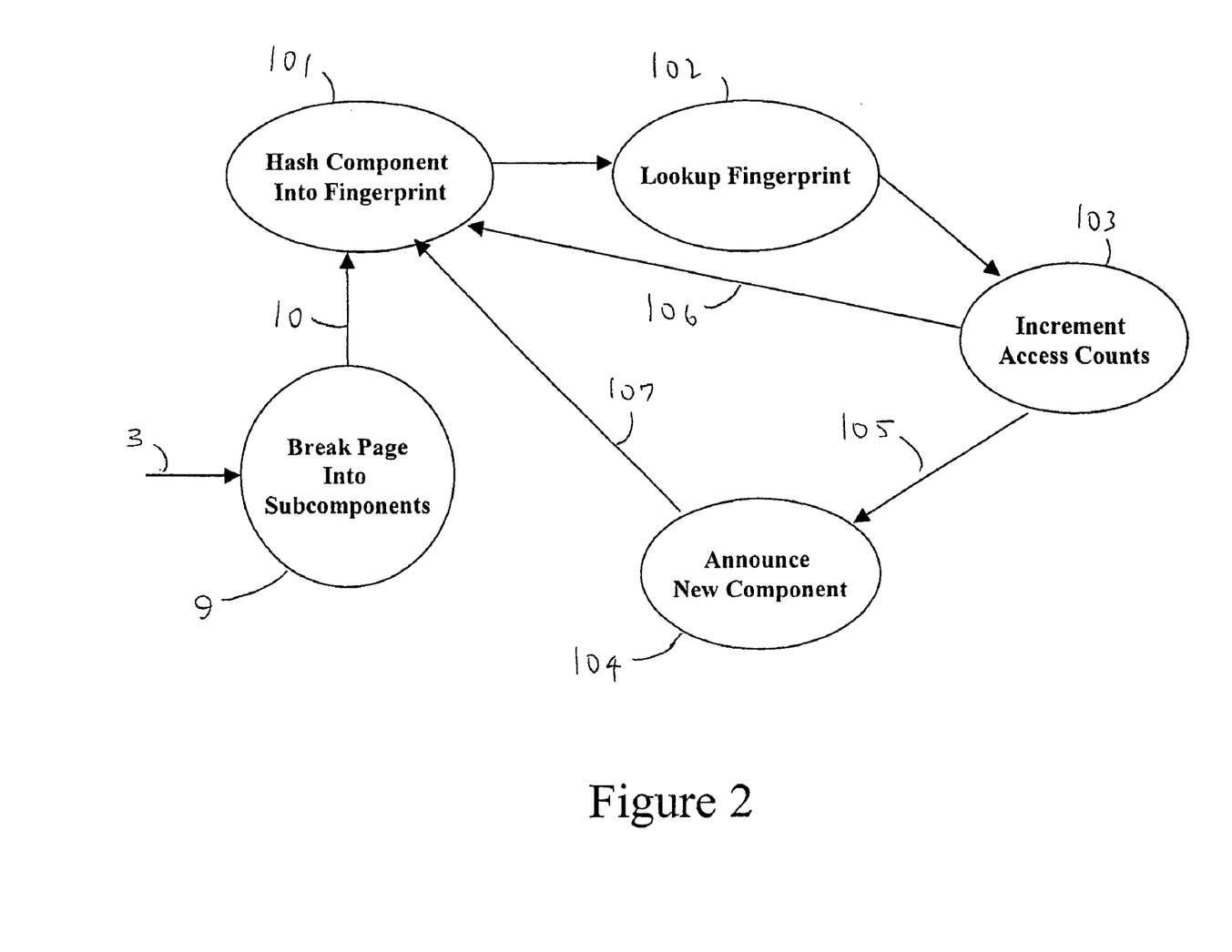
FIG. 2 depicts the algorithm used to detect new relevant content pages or sub-components.

The processing done by the New Crawler 6 on the returned page 3 is further described with reference to FIG. 2. The invention provides a new way of looking at the returned HTML page 3, by breaking it up 9 into sub-components of content and arrangement. Sub-components make up an HTML page, and many pages can share sub components. These sub-components can be identified in a number of ways. One of the most obvious ways is to parse the HTML page using its Document Object Model parse tree, with each sub-tree or node (internal and external) being considered a sub component. An alternative method would be to render the page as a graphical image, break up the image into smaller images and use these images as sub-components. Still another method would be to render the HTML page to text, (possibly using the Unix Lynx web browser), and text parsing the page into its paragraphs. Each paragraph of text would be considered a sub-component. The method is inconsequential and dependent on the needs of the applications the new crawler is feeding.

By tracking the relative frequency of accesses to these sub-components based on user traffic, the "substantive content" can be discerned from the "non-substantive content". Furthermore, "new" components announced to data-mining applications are declared "new" after they have received enough accesses. The definition of "enough" is an algorithm or independent constant or function that is determined by the owners of the NC system.

For example, suppose a web page is broken up into 3 components A, B, and C, with C being further broken up into components D and E. The next step 101 in the process is to create a fingerprint for each component. Each of these fingerprints is stored along with a count of the number of accesses. When other pages are broken up and accessed and also contain any of the components A, B, C, D or E a further step 102 in the process will check the fingerprint against those which have been stored. If there is a match, the access count for the component will be incremented 103. The process will then repeat these steps for the next component, as indicated by step 106. Suppose that components A and D reflect transient dynamic content and components B and E are persistent articles, with C being a composite (for example, D is the current date and E being a persistent article). If 10 pages are broken up into components and components B and E have counts of 10, while components A, C and D have counts of 1, then one could say that components B and E contain highly accessed or "substantive" while component C contains rarely accessed or "non-substantive information". A threshold can be established for the access count of a component or sub-component, so that when the access count reaches the threshold at step 105 the component or sub-component is announced as new 104 before the process returns 107 to get the next component. Extensions to this algorithm may incorporate other information into the threshold besides access count. For example, a combination of access count and classification of topic importance by a classification engine may be used in determining threshold for announcement.

Figure 3:
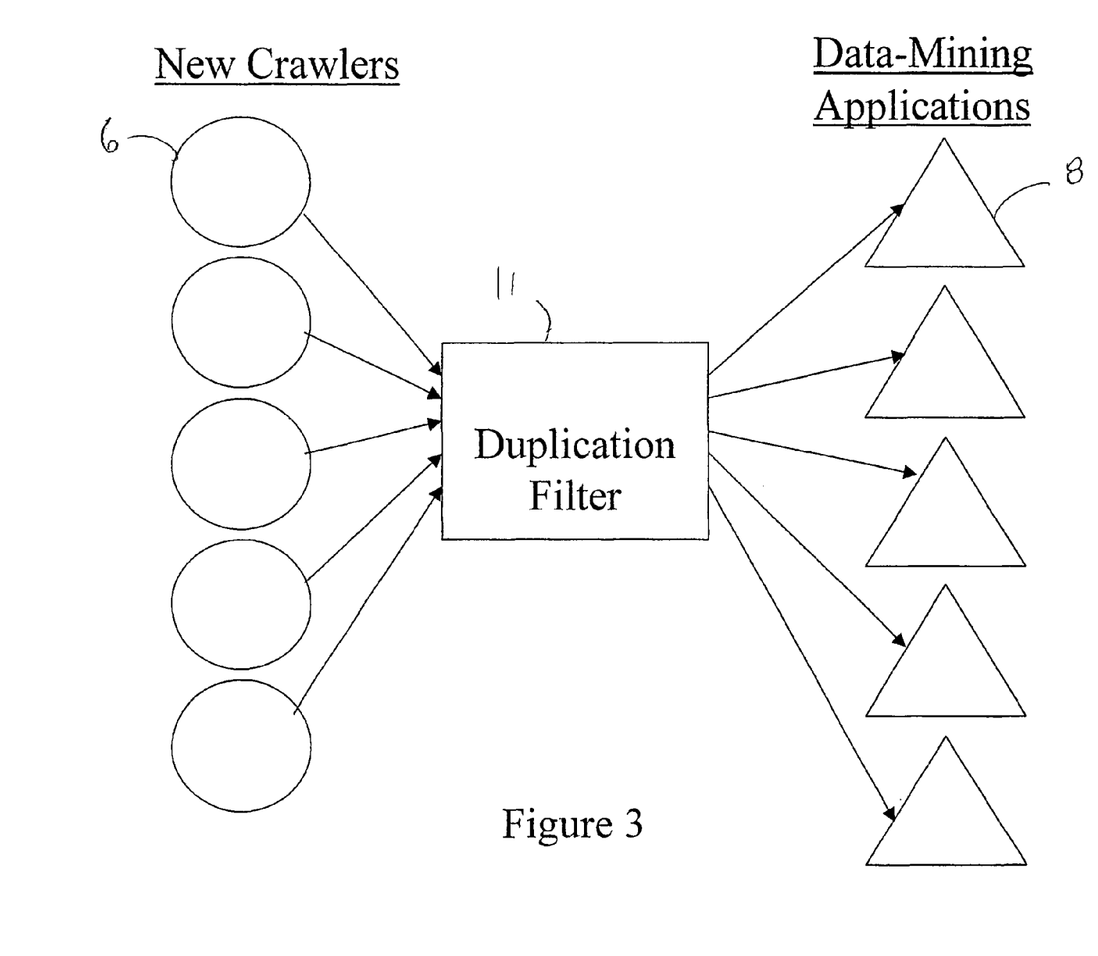
FIG. 3 depicts the operation of many NCs working together to feed many data-mining applications through a duplication filter.

By placing proxies or content sniffers in front of a plurality of web sites, and connecting them through a Duplication Filter as shown in FIG. 3, a system can be built to identify and report on changes to substantive sub-components. Without the Duplication Filter 11, individual NCs will not know what the other NCs have announced, because they work off of separate caches. But by having NCs 6 send announcements of new components 104 to the intermediary Duplication Filter 11 this problem is resolved. The Duplication Filter 11 acts to collapse multiple announcements into one. Communication is performed using standard networking approaches. Unicast or multicast techniques can be used where appropriate. In the preferred embodiment of the invention, network TCP/IP connections are initiated from the NC 6 to the Duplication Filter 11. Messages from the Duplication Filter 11 are sent to data-mining applications either through multicast or an overlay network. Without the presence of the Duplication Filter 11, the NCs 6 would multicast the updates to the data-mining applications directly. Therefore when new content is found separately by multiple NCs 6, only one announcement reaches the data-mining applications 8. In conjunction with a duplication filter, placing the NC's closer to the web servers will help reduce duplications as well.

The advantage to this method is that sub-components can gain relevance from across many web pages. Thus a news article that appears on every "personalized" page for users can be identified as relevant content, while the "personalization" content (sub-components) of the page, such as the users' name, will be disregarded as non-relevant. For example a book excerpt from amazon.com will exist in web pages given back to many user requests. However the request (URL) that generated that page (user name, time of day, other parameters, etc) may never occur again. Yet the book excerpt is handed out thousands of times a day. In this case the book excerpt sub-component would be announced to the data-mining applications while the other elements unique to the user requests will not be.

Specifically new crawlers filter the web traffic from web servers. They break the HTML responses up into sub-components and take 128 bit fingerprints of the sub-components to uniquely identify them (ID). They then record the number of hits an ID receives. When a sub-component receives a threshold number of hits, and the crawler can identify a URL that reliably accessed a page with the sub-component, then the crawler would announce this sub-component and URL as new.

This announcement would be received by any application that was tracking changes to the content on this web server. The testing of reliability would be performed by the NC requesting the page again with the same parameters that were used by one of the pages that incremented the access count for that sub-component. If the page returns again and contains the same sub-component, the sub-component is linked to the request parameters and both are announced to the data-mining applications. This testing of reliability demonstrates that the sub-component is "repeatably" accessible from this URL string. These applications can now use those parameters to gain access to the page if they wish to see the sub-component.

The pseudo-code below represents the algorithm. In addition, there would need to be a mechanism to expire the sub-components in the system after they have not been hit in a long time. This need arises from the fact that the server cannot have infinite memory to store all the new fingerprints of the sub-component. Many of which will only be hit once and never again. A simple algorithm to expire components would walk through the data cache and expire components that have not been accessed in a long time (to be defined by available resources). This can be done periodically or continually as a background thread.

The method of repeatability will also be used in the expiration algorithms. Pages may be periodically retested for repeatability, and if they are determined not to be repeatable they are expired.

The method of the present invention is implemented in the following pseudo-code. Note that sub-sections should be all possible parse-trees, and all possible permutation where you remove a sub-tree. This takes care of the problem where you care about a main page changing, but not how it changes.

| Pseudo Code Algorithm |
|---|
| //Subsections should be all possible parse-trees, and
//all possible permutation where a sub-tree is
//removed. This takes care of the problem where you
//care about a main page changing, but not how it //changes.
class SubComp{
    boolean is__Root;
    SubComp root__Comp;
    long finger__Print;
    long access__count;
    long last__change;
    HashSet access__URLS;
}
void ProcessWebServerReturnPage(Url, Page, responseCode){
    //only use valid HTML responses
    if((responseCode < 200 ) || (responseCode >= 300))
        return;
    //parse the page into sub sections
    SubComp__TREE.create(Page);
    //OPTIMIZATION:
    //If root component receives enough accesses and
    //can be confirmed to always map to this URL,
    //then remove this any other root component that
    //had this URL in its access__URL set.
    //    -Remove the URL from other root component
    // access__URLS because now this URL has
    // permanently shifted to a new root page
    //    -Send removal notices of these other root
    // components if removals occur
    //    -Delete root component
    //OPTIMIZATION:
    //To reduce static content redundancy (multiple
    //announcements) Only announce non-root components
    //if the set of ULRs with this sub-component
    //is greater then it's root__component URLs.
    //    -This identifies TRUE dynamic content, not just
    // static content and static content with
    // multiple access paths.
    SubComp root = CRC__TREE.root( );
    while(CRC__TREE.hasNext( )){
        finger__print = HASH( CRC__TREE.next( ) );
        SubComp Comp;
        if(COMP__CACHE does not contain finger__print){ |

-continued

Pseudo Code Algorithm

```
        Comp = new SubComp(finger_print);
        COMP CACHE.put(comp);
    }
    else{
        Comp = COMP_CACHE.get(finger_print);
    }
    Comp.access_count++;
    Comp.last_change = NOW;
    Comp.root_Comp = root;
    if(!Comp.access_URLS.contains(Url)){
        if(Url.isRepeatable( )){
//request the page again and if it
//contains this subcomponent, then
//it is repeatable
            Comp.access_URLS.add(Url);
        }
    }
    if(Comp was not Announced){
        if(Comp.access_count = = Threshold){
            Send_New_Component_Detected(Url, Comp);
        }
    }
  }
}
//+ Expire Comp that are not accessed often
//+ Expire Comp that are part of static content and
//+ root has been announced
//+ Expire Comp with high counts but no Repeatable
//+ nodes.
//ExpireNodes will be called periodically by
//a background thread
ExpireNodes( )
{
    //Algorithm dependent on available resources
}
```

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for web crawling that handles static and dynamic content, comprising the steps of:
    monitoring web traffic at a plurality of points, each said point being between a webserver and a user, said web traffic comprising web pages responsive to URLs;
    for a plurality of web pages in said web traffic, recursively parsing each said web page into sub-components;
    assigning a unique fingerprint to each said parsed sub-component;
    labeling as substantive those said sub-components whose fingerprints recur in monitored web traffic, said recurrence being in excess of a threshold metric;
    identifying as changed those web pages in said web traffic wherein a substantive sub-component is added or removed;
    eliminating duplicates in changed web pages identified in said identifying step; and
    announcing said changed web pages to data-mining applications.

2. The method of claim 1, wherein said monitoring is accomplished by proxying said web traffic.

3. The method of claim 1, wherein said parsing includes using a parse tree of said web page, said web page having tree nodes and each tree node being a sub-component.

4. The method of claim 1, wherein said parsing includes rendering said web page as a graphical image and breaking said image into smaller images, each said smaller image being a sub-component.

5. The method of claim 1, wherein said parsing includes rendering said web page as text and parsing said text into paragraphs, each said paragraph being a sub-component.

6. The method of claim 1, wherein said substantive sub-components are expired after a period of time without recurrence.

7. The method of claim 1, wherein said monitoring is limited to those web pages embedded with a tag designating said page as available for discovery.

8. A method for filtering dynamically generated content from change detection engines serving data-mining applications, comprising the steps of:
    recursively parsing web pages responsive to URL requests into sub-components, said web pages appearing in web traffic;
    assigning a unique fingerprint to each said parsed sub-component;
    labeling as substantive those said sub-components whose fingerprints recur in monitored web traffic, said recurrence being in excess of a threshold metric;
    identifying as changed those web pages in said web traffic wherein a substantive sub-component is added or removed; and
    eliminating duplicates in changed web pages identified in said identifying step.

9. The method of claim 8, wherein said identification step includes the further step of determining that said substantive sub-component is repeatably contained in said web page response to a URL request.

10. The method of claim 8, further comprising the step of announcing said changed web pages to data-mining applications.

11. The method of claim 10, wherein said identification step includes the further step of determining that said substantive sub-component is repeatably contained in said web page.

12. A method for web crawling that handles static and dynamic content, comprising the steps of:
    monitoring web traffic at a plurality of points, each said point being between a webserver and a user, said web traffic comprising web pages responsive to URLs;
    for a plurality of web pages in said web traffic, recursively parsing each said web page into sub-components;
    assigning a unique fingerprint to each said parsed sub-component;
    keeping a count of recurrence of each said unique fingerprint.

13. The method of claim 12, further comprising the step of determining those said sub-components for whom said count is in excess of a threshold number.

14. The method of claim 13, further comprising the steps of
    identifying as changed those web pages in said web traffic wherein a substantive sub-component is added or removed;
    eliminating duplicates in changed web pages identified in said identifying step; and
    announcing said changed web pages to data-mining applications.

15. A computer program for web crawling that handles static and dynamic content, comprising:

a routine for monitoring web traffic at a plurality of points, each said point being between a webserver and a user, said web traffic comprising web pages responsive to URLs;

a routine for recursively parsing each said web page into sub-components;

a routine for assigning a unique fingerprint to each said parsed sub-component;

a routine for labeling as substantive those said sub-components whose fingerprints recur in monitored web traffic, said recurrence being in excess of a threshold metric;

a routine for identifying as changed those web pages in said web traffic wherein a substantive sub-component is added or removed;

a routine for eliminating duplicates in changed web pages identified in said identifying step; and a routine for announcing said changed web pages to data-mining applications.

16. A method for web crawling that handles static and dynamic content by monitoring web traffic at a plurality of points, each said point being between a webserver and a user, said web traffic comprising web pages responsive to URLs.

17. A method for web crawling that handles static and dynamic content, comprising the steps of:

using a parsing algorithm to recursively parsing web pages responsive to URL requests into sub-components, said web pages appearing in web traffic;

using a loss-full algorithm to assign a unique fingerprint to each said parsed sub-component in each said URL;

sending to a data-mining application said parsing algorithm, said loss-full algorithm, and said sub-component fingerprints correlated to each corresponding URL, wherein said data-mining application is enabled thereby to repeatably locate any of said sub-components.

18. The method of claim 17, further comprising the steps of:

labeling as substantive those said sub-components whose fingerprints recur in monitored web traffic, said recurrence being in excess of a threshold metric;

identifying as changed those web pages in said web traffic wherein a substantive sub-component is added or removed; and eliminating duplicates in changed web pages identified in said identifying step.

19. The method of claim 18, wherein said threshold metric is an algorithm that uses a count of said recurrence as a parameter.

20. The method of claim 19, wherein said threshold metric is an algorithm that uses at least one additional factor besides said count as a parameter.

* * * * *